United States Patent [19]

Tamura et al.

[11] 4,126,871

[45] Nov. 21, 1978

[54] FOCUSING SYSTEM IN A CAMERA

[75] Inventors: Shuichi Tamura, Yokohama; Kazuya Hosoe, Machida; Hideo Yokota, Tokyo, all of Japan

[73] Assignee: Canon Kabushiki Kaisha, Tokyo, Japan

[21] Appl. No.: 831,117

[22] Filed: Sep. 7, 1977

[30] Foreign Application Priority Data

Sep. 8, 1976 [JP] Japan .................. 51-107400

[51] Int. Cl.² .............................................. G03B 7/08
[52] U.S. Cl. .................................................... 354/25
[58] Field of Search ................... 354/25, 61, 198, 199, 354/289, 23 R, 60 E, 163; 352/140; 355/56

[56] References Cited

U.S. PATENT DOCUMENTS

| | | | |
|---|---|---|---|
| 3,236,166 | 2/1966 | Steisslinger et al. | 354/61 |
| 3,730,068 | 5/1973 | Freeland | 352/140 X |

*Primary Examiner*—Michael L. Gellner

*Attorney, Agent, or Firm*—Toren, McGeady and Stanger

[57] ABSTRACT

A focusing system in a camera having an automatic focus detector to detect a focusing condition of a photo-taking optical system, an electromagnetic driving motor which is actuated in one direction, being controlled by the detector and having its operation stopped when an in focus state is detected by the detector, a movable member which can restrict the operation of said driving motor and at the same time is shiftable in response to the shifting of the photo-taking optical system, and an indicator which indicates the in focus position and is driven by said driving motor. The photo-taking optical system is shifted from a prescribed position in a predetermined direction for adjusting the focus. The movable member is correspondingly shifted from a prescribed position in a predetermined direction to release the restriction over the driving motor and to line up with the position of the indicator manually setting the optical system to the in focus position indicated by the indicator.

17 Claims, 14 Drawing Figures

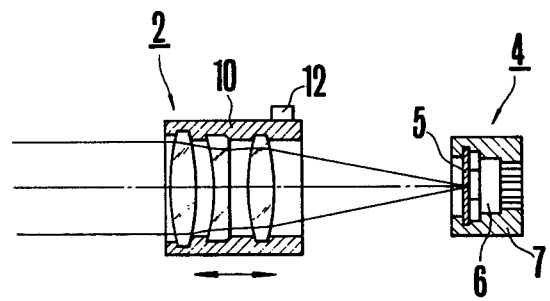
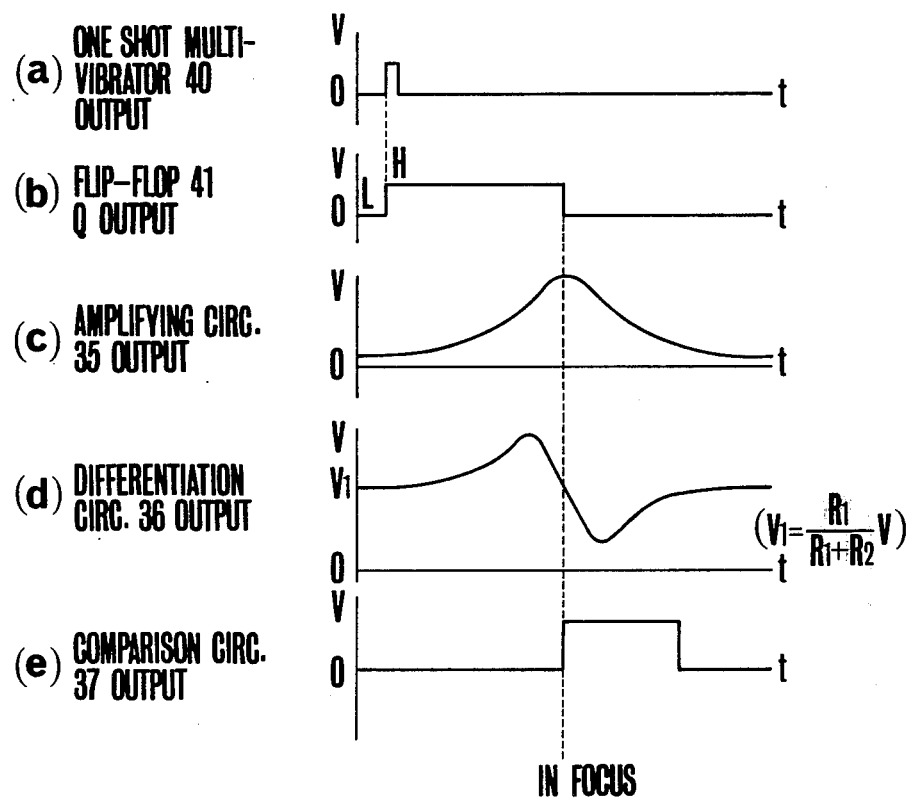

FOCUSING SYSTEM IN A CAMERA

BACKGROUND OF THE INVENTION

1. Field of the Invention

The present invention relates to a further improvement in a focusing system of a camera, particularly a camera having a device to automatically detect an in focus position of a photo-taking optical system.

2. Description of the Prior Art

Such a camera having a so-called automatic focus detecting device for automatically detecting a focusing condition of a photo-taking optical system in place of a human eye, in which further a setting of the photo-taking optical system is automatically done together with an automatic operation of focus detection, has been proposed hereto in many ways and has been actually employed in some cases.

While a majority of such camera uses a motor as a driving source for automatic setting of a photo-taking optical system, when a motor is used as a driving source as mentioned, there are such shortcomings that a reduction device and a large capacity power source, etc. therefor are needed together with said motor, which hinders reduction in a size and a weight of camera also a reduction in cost of the same, further when a servo-motor, etc. is used for automatically adjusting the photo-taking optical system to a proper direction with such information as a direction to which focusing is deflected either to a foreground or to a background being taken into consideration, a control circuit thereof becomes complicated and along therewith a control of said motor with a high degree of accuracy becomes difficult, thus exact focusing of the photo-taking optical system becomes very difficult.

In view of said disadvantages in using such motor, there is a system which uses a driving mechanism employing a functioning power of a spring in place of a motor as the above mentioned driving source, but even in said case there are such disadvantages that such complicated mechanisms as a speed regulating mechanism and a stopping mechanism, etc. are needed, also it is necessary to reset the photo-taking optical system always at a prescribed initiating position together with an adjusting mechanism thereof, thus a mechanism for that end needs to be provided, also its handling becomes very troublesome, further, it becomes difficult to stop and retain the photo-taking optical system quickly in response to an in focus signal outputted from a focus detecting device only by a simple mechanism, thus exact setting of the photo-taking optical system can not be done.

Also, when the focus adjusting of the photo-taking optical system is automatized, a manual adjusting thereof becomes impossible in an ordinary case, therefore, there will be great inconveniences in such case when for example, a photographer wants to take a picture of the entire zone of the scene with a deepened depth of field.

On the other hand, when an automatization is done only for focus detection and automatization of the adjusting of the photo-taking optical system is not intended, the above mentioned disadvantages can be eliminated, however, many of such systems have an in focus information from a detecting device indicated by such indication means as a meter, a lamp, etc., and in such set up, a camera user is required to have certain skill in adjusting the photo-taking optical system for finding out an in focus position thereof, also it is either very difficult or totally impossible to detect the directivity of deflection of focusing in the photo-taking optical system only by such indication means as a meter or a lamp, etc., thus the camera user is compelled to make such very troublesome handling that it is judged whether or not the photo-taking optical system reaches the in focus point by the indication state of the indication means at a time when the photo-taking optical system is shifted back and forth near the in focus point, thus it is very inconvenient to achieve exact focus adjusting of the photo-taking optical system.

SUMMARY OF THE INVENTION

The present invention is made in view of the above, and it is a primary object of the present invention to provide further improvements in a camera in which automatization is done only in focus detection but automatization is not intended for adjusting a photo-taking optical system, and to provide such unique focusing system that the above mentioned disadvantages of this kind of camera are totally eliminated and the system can be made with a comparatively simple set up and low cost yet its handling is simplified, and particularly exact focusing can be expected always without considerations for a directivity of deflection in focusing of a photo-taking optical system.

Another object of the present invention is to provide a further improved focusing system which can be easily built in, for example, a pocket size camera or a middle class photo-taking camera, etc. and has more practical advantages as used in such cameras, in addition to the primary object mentioned above.

And to achieve said objects such focusing system of semi-automatic type in this kind of camera is proposed in the present invention that an automatic focus detecting means to detect the focusing condition of a photo-taking optical system, an electro-magnetic driving means which is activated to one direction, being controlled by said detecting means and has its operation stopped as an in focus state is detected by the detecting means, a movable means which can restrict the operation of said driving means and at a same time is shiftable in correspondence to the shifting of the photo-taking optical system, and an indication means which has an indicating part to indicate an in focus position and is driven by said driving means, are provided therein, wherein said photo taking optical system is shifted from a prescribed position to a predetermined direction in adjusting focus, thereby said movable member is shifted in correspondence thereto from a prescribed position to a predetermined direction for releasing said restriction over the driving means, and the in focus position of said photo-taking optical system is detected in a course of setting of said photo-taking optical system, by a position at which said indication means is stopped in correspondence to a stopping of the operation of said driving means at a time when the in focus state is detected by said detecting means, thus achieving a focus adjusting of said photo-taking optical system.

Further objects and characterizing features of the present invention will be revealed from the following descriptions to explain the same referring to the drawings of examples attached hereto.

BRIEF DESCRIPTION OF THE DRAWINGS

Now some preferable embodiments of the presents invention will be explained referring to the drawings attached hereto. In said drawings, FIGS. 1 to 6 are to show a first example of a camera comprising a focusing system of the present invention.

FIG. 1 is an oblique view to show a set up of an important part especially related to the present invention.

FIG. 2 are diagrammatical sketches to show a relative positional relationship among an adjusting member for focus adjusting, a resetting switch and an initiating switch in said camera in a state each one thereof is activated, wherein FIG. 2A shows a reset state while

FIG. 3 is a diagrammatical sketch to show a basic set up of a focus detecting device of an image sharpness detecting type being provided in said camera.

FIG. 4 is a circuit diagram to show a set up for a signal processing circuit in said detection device.

FIG. 5 is an output waveform diagram to show variations in the output signals of each circuit in the signal processing circuit shown in FIG. 4.

FIG. 6 are diagrammatical sketches to show a relative positional relationship among a driving means, an output lever, an indication member and a movable member in said camera in a state each one thereof is activated, wherein FIG. 6C shows a state when said movable member is reset, while

FIG. 8 is an oblique view to show a set up of an important part particularly related to the present invention in a same manner as in FIG. 1.

FIG. 9 is a circuit diagram to show a set up of the signal processing circuit in a passive range finding type focus detecting device provided in said camera.

FIG. 10 is an output waveform diagram to show variations in the output signal of each circuit block in the signal processing circuit shown in FIG. 9.

DETAILED DESCRIPTION OF THE PREFERRED EMBODIMENTS

First, explanations will be made on the first example of the present invention referring to FIGS. 1 to 5.

Figure 1:
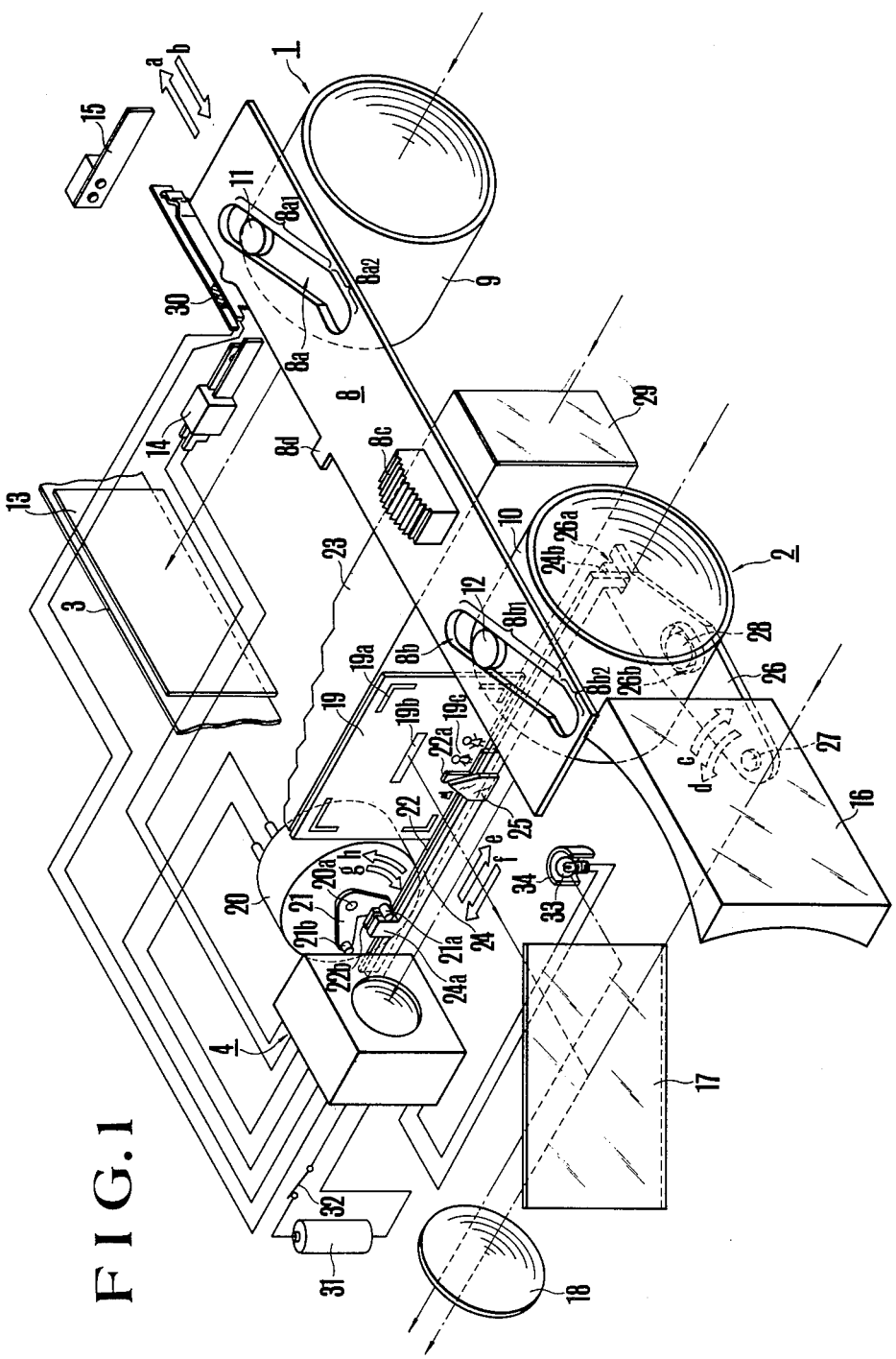

In FIG. 1, what is shown as 1 is a photo-taking optical system, 2 is an imaging optical system for detection of focusing, and a film 3 and a unit 4 for focus detection are so positioned, that their relative optical positional relationship will have a prescribed relationship respectively, in the rear of said systems 1 and 2. What is shown as 13 is a shutter positioned in front of the film 3.

Said detection unit 4 consists of a photo-electric conversion element to provide output responding to a variation in a sharpness of an image and a signal processing circuit 6 being integrated as much as possible to process the output of said element 5, both of which are enclosed in one casement 7, wherein as said photo-electric conversion element 5, for example a photo-conductive element may be used or plural number of fine photo-voltaic elements being virtually independent from each other, or a solid image sensor element such as CCD (charge coupled device,), photo-diode may be used, thus it can be one by which the maximum or minimum output, further pulse output can be obtained at a time of in focus state by an appropriate signal processing circuit.

What is shown as 8 is an adjusting member for focus adjusting, and has two cam grooves 8a, 8b for focus adjusting bored therein, wherein a pin 11 planted on an outer tube 9 of the photo-taking optical system 1 and a pin 12 planted on an outer tube 10 of the focus detecting optical system 2 are fitted into the cam grooves 8a, 8b, respectively in a slidable manner, further said both optical systems 1 and 2 can be shifted along an optical axis of each one thereof by shifting said adjusting member 8 by its operating part 8c to the directions of arrows a and b in the drawing.

Figure 2A:
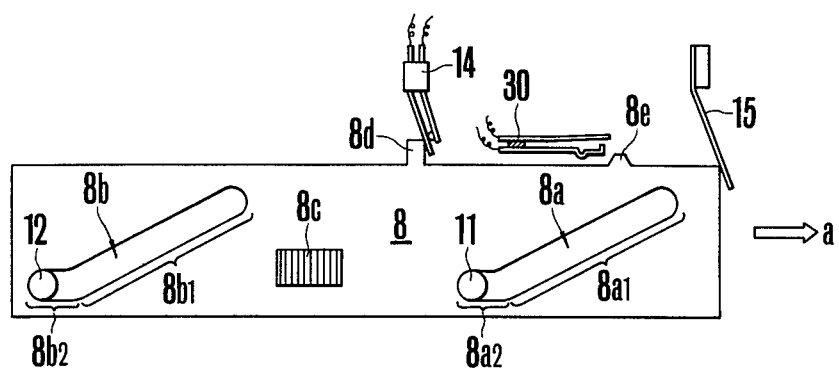

Said cam grooves 8a, 8b have oblique groove parts $8a_1$, $8b_1$ to set said optical systems 1 and 2 from the closest distance position to the infinite distance position, and parallel groove parts $8a_2$, $8b_2$ being provided in continuity to tail end parts at the closest distance position setting sides of said oblique groove parts $8a_2$, $8b_1$, to allow the adjusting member 8 to be shifted from the closest distance setting position further to the direction of the arrow "a" in the drawing while said optical system 1 and 2 are retained at their closest distance positions, wherein said adjusting member 8 is so made as being able to drive a resetting switch 14 to inverse the operating direction of an electro-magnetic driving means to be described later by an operating projection 8d thereof as it is shifted from its closest distance setting position further to a direction of the arrow "a" in the drawing (refer to FIG. 2A).

Figure 2B:
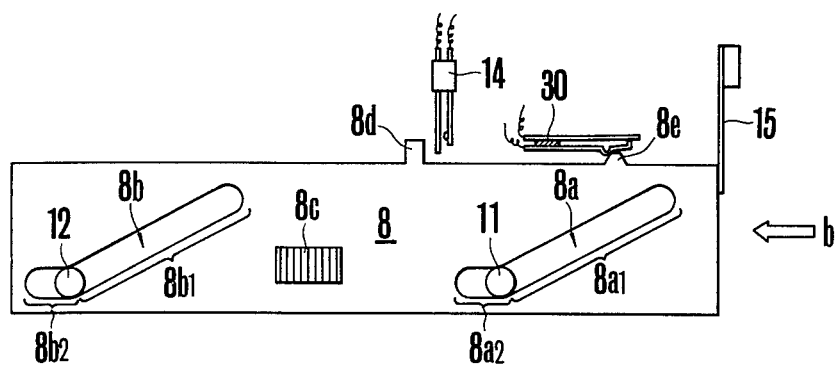
FIG. 2B shows an initiating state.

Further, what is shown as 15 is a return sheet spring to automatically return said setting member 8 to the closet distance setting position when it is shifted beyond its closet distance setting position, wherein said spring 15 is placed at such position as being able to work on said setting member 8 within the ranges of the parallel groove parts $8a_2$, $8b_2$ in the cam grooves 8a, 8b of the member 8 (refer to FIGS. 2A, 2B). What is shown as 16 is an objective lens constituting a finder optical system, and 17 is a semi-transparent mirror, while 18 is an eye-piece lens positioned in rear of said mirror 17.

What is shown as 19 is a finder information indication plate, having information marks 19a, 19b, 19c to indicate a photographing field of view, a focus detecting field of view and an approximate photo-taking distance, etc., and being so positioned as facing a light exit plane of a prism 23 for light guide, wherein the information generated at said indication plate 19 by the light emerging from said prism 23 can be visually recognized by the eye-piece lens 18 through the reflective plate of said semi-transparent mirror 17. What is shown as 20 is an electro-magnetic driving means with comparatively low output such as a meter or a micro-motor, etc. as an example, which is operated to one direction as being controlled by the signal processing circuit 6 in the detection unit 4 and has its operation stopped at a time when the detection unit 4 detects an in focus state, wherein said means 20 has an output axle 20a on which a V-shape lever 21 having two pins 21a, 21b planted thereon as an output member is fixedly provided. Also when a meter is used as said electro-magnetic driving means 20, such reversible motor for example a servometer, etc. that a coil spring for returning to zero is not built in for an output axle thereof and said axle continues rotation to a direction corresponding to a polarity of voltage or current being supplied as long as said voltage or current is kept supplied.

What is shown as 22 is an indication member which is driven by the pin 21a on the output lever 21 to indicate an in focus position (an in focus object distance) on the distance information mark 19c of the information indication plate 19 by its indicating part 22a when the driving means 20 stops its operation that is when an in focus state is detection by the detection unit 4, wherein said member 22 has a projection 22b engageable with the pins 21a, 21b on the output lever 21 and is positioned slidably in front of the information indication plate 19.

Also said indication member 22 may be formed with semitransparent synthetic resin material to facilitate distinguishing the indicating part 22a thereof and the information marks 19a, 19b, 19c on the information indication plate 19, on the other hand a yellow filter 29, as an xample, may be bonded to a light incidence end plane of the prism 23 so that the information light beam from each of the information marks 19a, 19b, 19c at the indication plate 19 may be colored in yellow, to secure better effect.

What is shown as 24 is a movable member being slidable in an association with the setting of the both optical systems 1 and 2 as being driven by the rotation lever 26 linked with the focus detecting optical system 2, having an operating projection 24which is engaged with the pin 21a of the output lever 21 and can stop and restrict said driving means 20, and being positioned along with said indication member 22, and at a same time, said member 24 is coupled to a two arms part 26a at a forward end of said rotation lever 26 by a hook shape arm 24b at a forward end thereof, wherein said rotation lever 26 is coupled to the pin 28 planted on the outer tube 10 of the detecting optical system 2 by its oval groove 26b, and is axially attached to an appropriate place on a camera main body by an axle 27 in a rotatable manner.

Here, while not being shown in the drawings said indication member 22 and the movable member 24 are supported by an appropriate guide means such as a guide groove, etc. so that they can be freely slided without contacting to each other.

Also a marking filter 25 such as a red filter, etc. is bonded, as an indicating part to indicate the setting positions of said optical systems 1, 2, at said movable member 24 at such position thereof as corresponding to the indicating part 22a of the indication member 22.

Also, said driving means 20 is so designed as having comparatively small output that it is rotatingly operated to a prescribed direction according to the output signal from said detection unit 4 to drive said indication member 22 only when the restriction by the projection 24a of the movable member 24 over the pin 21a of the output lever 21 is released, further the indication member 22 itself is made to have a very light weight so that it can be sufficiently driven by a small output of said driving means 20.

What is shown as 30 is a start switch to initiate said driving means 20 and is placed at such position as being initiated by the operating projection 8e of the adjusting member 8 when said adjusting member 8 is set at its closest distance setting position (refer to FIG. 2B), wherein it is connected to the signal processing circuit 6 within the detection unit 4.

What is shown as 31 is a power source for said detection unit 4, and 32 is a power source switch, while 33 is a lamp for indicating focusing detection being controlled by the signal processing circuit 6 within the detection unit 4, for being lighted for a prescribed period of time to indicate an in focus state within a finder when said optical systems 1 and 2 are set at in focus state against an object. What is shown as 34 is a shade to prevent a leakage of light from said lamp 33 onto surrounding zone.

Figure 4:
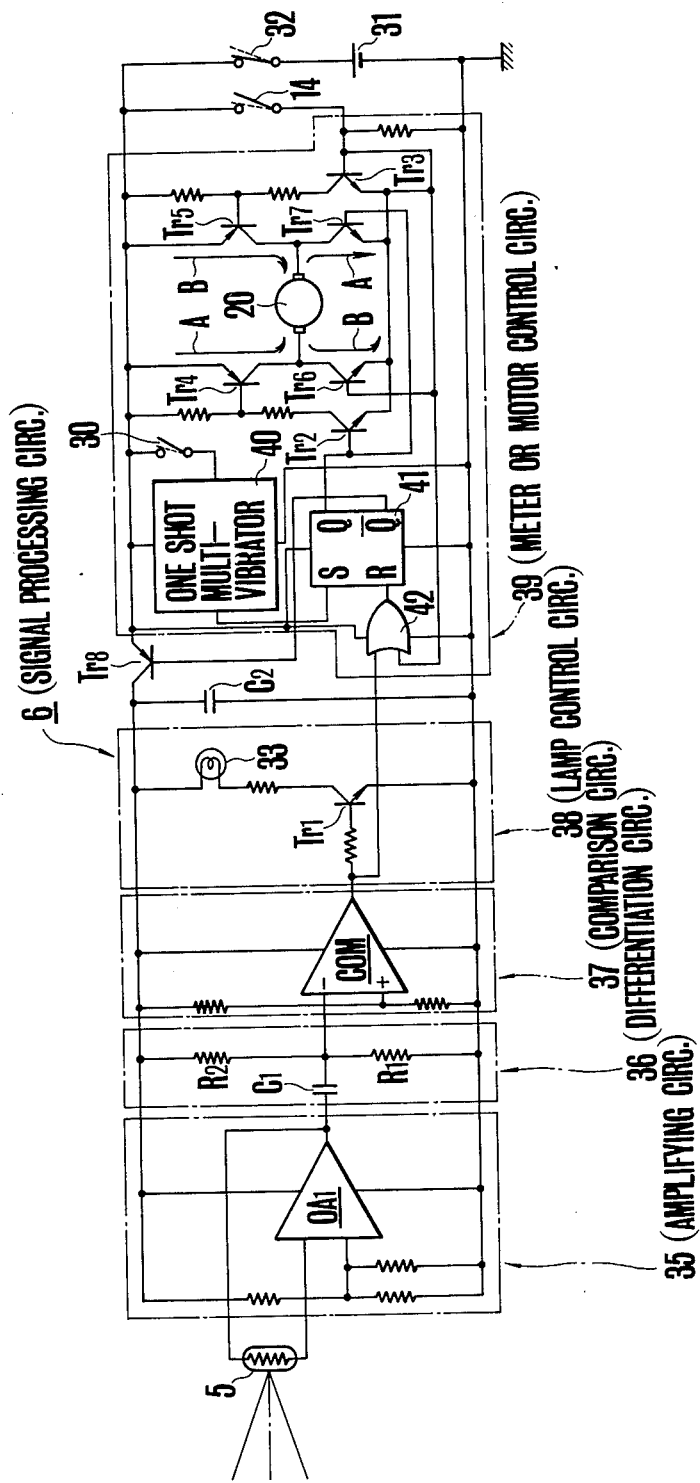

Now, the details of the signal processing circuit 6 in said detection unit 4 are as shown in FIG. 4. That is in said drawing, what is shown as 35 is an amplifying circuit to amplify the output of the above mentioned photo-electric conversion element 5, being made by an operational amplifier $OA_1$ as its main constitutent, and said photo-eletric conversion element 5 is connected to a feed back path of said amplifier $OA_1$. Also said amplifying circuit 35 amplifies the output of said element 5 and generates outputs showing such variations as reaching the maximum value at an in focus state as being shown in FIG. 5(c at a time of focusing.

What is shown as 36 is a differentiation circuit to differentiate the output of said amplifying circuit 35, consisting of a condensor $C_1$ and a resistors $R_1$ and $R_2$, and said circuit 36 differentiates the output of said amplifying circuit 35 at a time of focusing and generates such output as suddenly changing from above to below a predetermined voltage level $V_1$ [$V_1 = (R_1/R_1 + R_2) V$] which determined by said resistors $R_1$ and $R_2$ and a source voltage level V with the in focus point serving as a turning point as shown in FIG. 5(d). What is shown as 37 is a comparison circuit to compare the output of said differentiation circuit 35 against a predetermined voltage level $V_1$ which is slightly lower than said voltage level $V_1$, consisting of a comparator COM, and since it is so made at a time of said comparison that the output of the differentiation circuit 36 is given to the (−) input side terminal of said comparator COM, outputs of such pulse shape as shown by FIG. 5(e) is generated when the output of the differentiation circuit 36 becomes lower than said voltage level $V_1$ at a time of focusing.

What is shown as 38 is a lamp control circuit to control the lighting of said lamp 33 based on the output of said comparison circuit 37, comprising a switching transistor $Tr_1$ as its prime constituent.

What is shown as 39 is a meter or motor control circuit to control said driving means 20, consisting of a one-shot multi-vibrator 40 to output such pulse signals as shown in FIG. 5(a) when power is supplied from a power source 31 by closing of said initiating switch 30 (shown in FIG. 2B) a flip-flop 41 which is shifted to a set state having the pulse output from said one-shot multi-vibrator 40 given to its set input S as shown in FIG. 5(b) and is shifted to a reset state by having the output of the comparison circuit 37 or the high level signal generated by closing of the resetting switch 14 given to its reset input R by an OR-gate 42, and six transistors $Tr_2$ to $Tr_7$ including four transistors $Tr_4$ to $Tr_7$ which are complementarily connected to the driving means to control initiation and stopping as well as an operating direction of said driving means 20 based on the Q output of said flip-flop 41 and the high level signal generated by the closing of the resetting switch 14.

Also, $Tr_8$ is a switching transistor provided in a power source path between said circuits 35 to 38 and the circuit 39 to control the power supply to the circuits 35, 36 37 and 38, and has its ON-OFF controlled by the Q output of the flip-flop 41 in the circuit 39. Also $C_2$ is a condensor provided to retain power supply to said circuit 35 to 38 for a prescribed period of time after turning-off said transistor $Tr_8$.

Next, explanations will be made on a function of a camera comprising a focusing system according to the present invention having the above mentioned set up at a time of photographing.

First, a camera is pointed toward an object by the photo-taking field of view mark 19a and the focus detecting field of view mark 19b appearing within a finder field of view, and a power source switch 32 is put in.

When the indicating part 22a of the indication member 22 and the mark filter 25 of the movable member 24 are not located at tje closet distance position against the photo-taking distance mark 19c, that is when the resetting of each operating member to its initiating position is not done, the adjusting member 8 is shifted to a direction of an arrow "a" in the drawing by its operating part 8c before the initiation of focusing to conduct the resetting of each operating member. That is, when the adjusting member 8 is shifted to a direction of the arrow "a", the optical systems 1 and 2 are pulled out to front direction that is toward the closest distance position by the oblique groove parts $8a_1$, $8b_1$ of the cam grooves 8a, 8b thereof, then the rotation lever 26 coupled to the detecting optical system 2 is rotated around the axle 27 to a direction of an arrow "c", therefore, the movable member 24 coupled to said rotation lever 26 pushes the pin 21a of the output lever 21 by its projection 24a, and is slided to a direction of arrow "e" until its mark filter 25 reaches the closest distance position at the photo-taking distance mark 19c while rotating said output lever 21 to a direction (a direction of an arrow "h") reverse to a rotating direction (a direction of an arrow "g") at a time when it is in operation together with the output axle 20a of the driving means 20, and at that time, the indication member 22 is flowingly slided to a direction of the arrow "e" by the other pin 21b of the output lever 21 (a state shown in FIG. 6C).

And when the adjusting member 8 is shifted further to the direction of the arrow "a" resisting the sheet spring 15 in a state the both optical systems 1 and 2 are set at their closest distance positions (a state shown in FIG. 2B), its projection 8d puts the resetting switch 14(in a state shown in FIG. 2A), thereby the flip-flop 41 within the meter or motor control circuit 39 is shifted to a reset state as the high level signal is given to its reset input R thorugh the OR-gate 42 in the signal processing circuit 6 at the detecting unit 4, therefore, its Q output becomes "low", thus the transistors $Tr_2$ and $Tr_7$ are turned-off and on the other hadn the transistors $Tr_3$ and $Tr_6$ are turned-on, thus eventually the transistors $Tr_4$ and $Tr_7$ out of the four transistors $Tr_4$ to $Tr_7$ being complementarily connected become turned-off while the transistors $Tr_5$ and $Tr_6$ are turned-on, therefore current flows to the driving means 20 through a channel shown by B in FIG. 4. Thereby the driving means 20 is rotated to a direction of an arrow "h" while sliding the indication member 22 to the direction of the arrow "e" by the pin 21b of the output lever 21 thereof, and at a time when the indicating part 22a of said indication member 22 matches with the mark filter 25 of the movable member 24 that is when the resetting of said indication member 22 to its initiation position is completed, said pin 21b collides with the projection 24a of the movable member 24, therefore said means 20 is restricted to be stopped (a state shown in FIG. 6D).

And when an operation of the operating part 8c is released as the resetting of said indication member 22 is completed, the adjusting member 8 is automatically returned to its closest distance setting position by the sheet spring 15 (a state shown in FIG. 2B), then, while the resetting switch 14 is opened, the initiating switch 30 is put in by the projection 8e, therby pulse signals (shown in FIG. 5(a)) are outputted from the one-shot multi-vibrator 40, therefore the flip-flop 41 is shifted to a set state and its Q output becomes "high" (shown in FIG. 5(b)) thus while the transistors $Tr_3$ and $Tr_6$ are turned-off, the transistors $Tr_2$ and $Tr_7$ are turned-on, and eventually the transistors $Tr_5$ and $Tr_6$ out of the four transistors $Tr_4$ to $Tr_7$ being complementarily connected are turned-off, while the transistors $Tr_4$ and $Tr_7$ are turned-on, and current flows to the driving means 20 through a channel shown by A in FIG. 4 (also since the Q output of the flip-flop 41 becomes "low" at this time, the transistor $Tr_8$ is turned-on, therefore, power is supplied from the power source 31 to the circuits 35 to 38 through said transistors $Tr_8$). By this, the driving means 20 is rotated to a direction of an arrow "g", and is restricted to be stopped again when the pin 21a at the output lever 21 collides with the projection 24a of the movable member 24 (a state shown in FIG. 6A).

Now, the resetting of each operation member to its initiating position has been completed by the above mentioned procedures, now when the adjusting member 8 is shifted beyond its closest distance position, the both optical systems 1, 2 will not be varied at all since the parallel groove parts $8a_2$, $8b_2$ at the cam grooves 8a, 8b engage with their respective pins 11, 12 thus they will retain the above mentioned state as being set at its closest distance position.

After above mentioned resetting process is completed when the adjusting member 8 is shifted with a constant speed in a comparatively slow manner to the direction of the arrow "b" by its operating part 8c while viewing a finder after the resetting of each operating member is compelted for shifting the optical systems 1, 2 from their closest distance positions toward their infinite distance position, the rotation lever 26 is rotated to the direction of the arow "d" in an association with the shifting of the detecting optical system 2, therefore the movable member 24 is slided to the direction of the arrow "f", thereby the driving means 20 is rotated to the direction of the arrow "g" following said movable member 24 in response to the signal outputted from the meter or motor control circuit 39 since the restriction over its output lever 21 by the projection 24a of the movable member 24 is released, therefore, the indication member 22 will be slided to the direction of the arrow "f" by the pin 21a of the output lever 21 with a same speed as that of the movable member 24.

On the other hand, while a sharpness of an object image on the photo-electric conversion element 5 will be gradually enhanced by the shifting of the detecting optical system 2 at the above mentioned detection unit 4, as said optical system 2 reaches an in focus point against an object the output of said element 5 reaches its extreme value, therefore the output of the amplifying circuit 35 also reaches the extreme value (as shown in FIG. 5(c)), thus the output of the differentiation circuit 36 makes sudden change from above to below said voltage level $V_1$ (as shown in FIG. 5(d)). And at a time when the output of the differentiation circuit 36 becomes below the voltage level $V_1$, high level signals of pulse shape is generated from the comparison circuit 37

(as shown in FIG. 5(e)), thereby the transistor $Tr_1$ is turned-on at the lamp control circuit 38 and the lamp 33 is lighted, also the filp-flop 41 is reset at the meter or motor control circuit 39 and its Q output becomes "low" (as shown in FIG. 5(b)), therefore the transistors $Tr_2$, $Tr_4$ and $Tr_7$ are turned-off and power supply to the driving means 20 is stopped, thus the driving means 20 is immediately stoppd. (Also, at this time, since the Q output of the flip-flop 41 becomes "high", the transistor $Tr_8$ is turned-off and power supply to the circuits 35 to 38 from the power source 31 is stopped, while power will be supplied to said circuits 35 to 38 by the electric charge stored at the condensor $C_2$ when the transistor $Tr_8$ becomes turned-off, therefore, power supply to the circuits 35 to 38 is maintained for a prescribed period of time after the flip-flop 41 is reset by the output of the comparison circuit 37, and is stopped completely when the condensor $C_2$ is completely discharged).

Therefore, it is indicated that the both optical systems 1 and 2 reach in focus point by the lighting of the lamp 33, and at a same time a photo-taking distance at this time will be indicated by the position of the indicating part 22a of the indication member 22 on the distance information mark 19c.

Therefore, when the operation of the adjusting member 8 is immediately stopped at a time the indication lamp 33 is lighted, the movable member 24 is stopped together with said indication member 22 in a state its mark filter 25 matches with the indicating part 22a of the indication member 22, and at this time the both optical systems 1 and 2 are retained at an in-focus position against an object, thus focus adjusting is completed (a state shown in FIG. 1).

Therefore, when a release button not shown in the drawing is operated at this state, the shutter 13 is activated and a clear image of an object will be formed on the film 3, and here, it is very difficult to instantly stop the operation of the adjusting member 8 at a moment the indication lamp 33 is lighted in the above operation, and the stopping of the adjusting member 8 is apt to be delayed thus such state is apt to take place that the optical systems 1 and 2 pass through their in focus point and are set at a side closer to a longer distance position side.

Figure 6A:
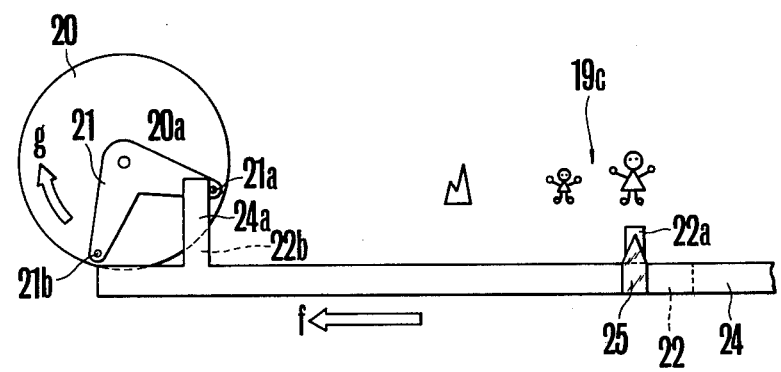
FIG. 6A shows an initiating state.
Figure 6B:
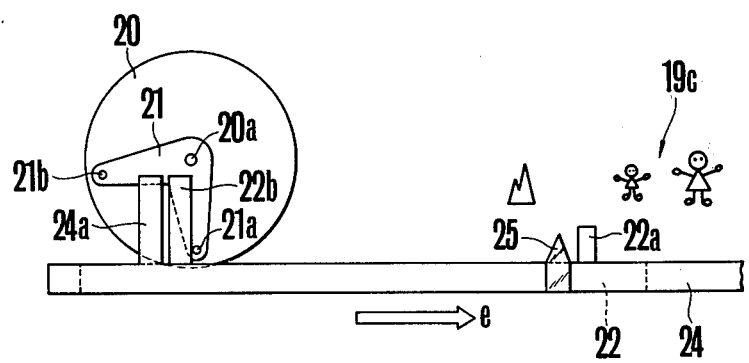
FIG. 6B shows an improperly set state.

The deflection of the both optical systems 1 and 2 against the setting position to the in focus positions at this time will be deviation of the mark filter 25 at the movable member 24 against the indicating part 22a at the indication member 22 as shown in FIG. 6B. Therefore, if the mark filter 25 of the movable member 24 has a deviation against the indicating part 22a of the indication member 22 at a time when the operation of the adjusting member 8 is stopped, the adjusting member 8 is shifted to the direction of the arrow "a" that is to the closest distance setting position side until the mark filter 25 of the movable member 24 matches with the indicating part 22a of the indication member 22, thus the optical systems 1 and 2 will be properly re-set at their in focus positions.

Also, when the stopping of the adjusting member 8 is delayed, the detecting optical system 2 is further shifted even after passing its in focus position, therefore the sharpness of image on the detecting unit 4 is lowered than that in its in focus state and is enhanced again by a resetting thereof afterward, thus the output of the photo-electric conversion element 5 will be varied, and since at this time the flip-flop 41 at the meter or motor control circuit 39 has already been reset by the in focus signal form the comparison circuit 37 and the power supply to the driving means 20 is stopped and said driving means 20 is stopped, the indication member 22 is stopped and retained at its in focus indicating position regardless of the setting of the both optical systems 1 and 2 out of the in focus positions.

While focus adjusting of the photo-taking optical system 1 is done by the above mentioned procedures to conduct photographing, when an object with different photo-taking distance is newly photographed, focus adjusting is done after resetting each operating member to its respective initiating position by such procedures as mentioned above, then a sharp image of an object will be properly imaged at a position corresponding to a film plane by the photo-taking optical system 1, thus photographing can be done always in an appropriate state.

Figure 6C:
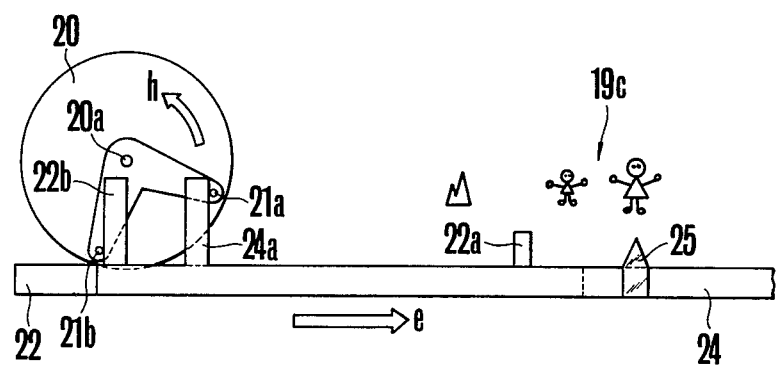
Figure 6D:
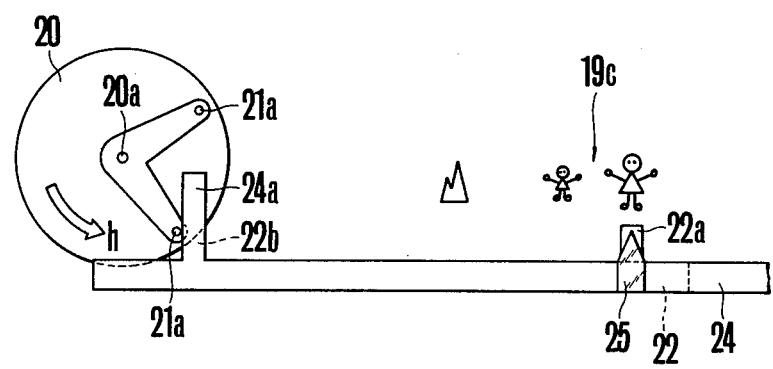
FIG. 6D shows a state when said indication member is reset.

Also, in the above mentioned example, when each operating member is reset at its respective initiating position the adjusting member 8 is shifted further to the direction of the arrow "a" beyond its closest distance setting position thereby the resetting switch 14 is put in the rotate the driving means 20 to a direction reverse to the rotating direction at a time of its operation (that is the direction of the arrow "h"), and at this time the indication member 22 is slided to the direction of the arrow "e" by the pin 21b of the output lever 21 (as shown in FIG. 6C) and is reset at its initiating position (that is the closest distance indication position) (as shown in FIG. 6D), then, thereafter the adjusting member 8 is returned to said closest distance setting position thereby the initiating switch 30 is put in and the driving means 20 is rotated to the direction of the arrow "g" until the pin 21a of the output lever 21 is restricted by the projection 24a of the movable member 24, thus the resetting is done (as shown in FIG. 6A), and it is also possible to have such set up that said driving means 20 and the indication member 22 are reset by only such operation as resetting the movable member 24 to its initiating position.

Figure 7:
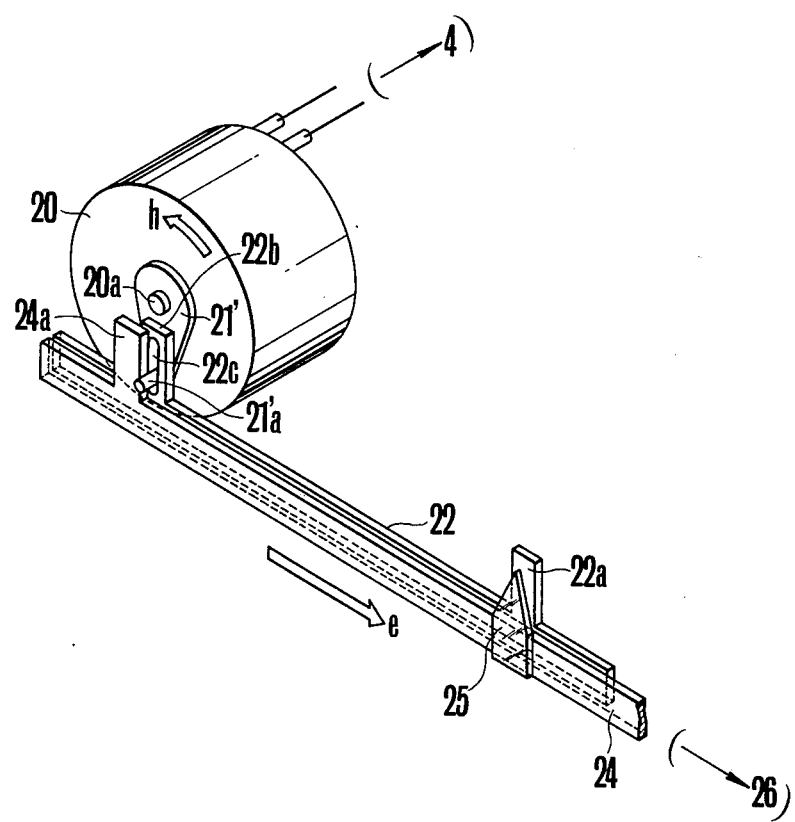
FIG. 7 is to show an improved example of a driving mechanism of the indication member in the focusing system shown in FIG. 1, and this drawing is an oblique view of a set up of an important part, showing a set up of only improved part in a simplified manner.

That is, as shown in FIG. 7, said output lever is made as a one arm lever 21' having only a pin 21'a and said pin 21'a and is so extended as going through an oval hole 22c bored at a projection 22b of the indication member 22 and being able to engage with a projection 24a of a movable member 24.

In such set up, when the movable member 24 is slided to the direction of the arrow "e" to reset the same at its initiating position the output lever 21' is forcedly rotated to the direction of the arrow "h" until it reaches its initiating position through the pin 21'b by the projection 24a, and at a same time the indication member 22 will be slided to the direction of the arrow "e" until it reaches its initiating position.

Therefore, in such set up as shown in FIG. 7, the parallel groove parts $8a_2$, $8b_2$ at the cam grooves 8a, 8b of the adjusting member 8, and the resetting switch 14 as well as the sheet spring 15 for returning, etc. will become totally useless, also said output lever 21' having the pin 21'a only, further the function of the meter or motor control circuit 39 to rotate the driving means 20 to a reverse direction becomes useless, thus a total set up will be further simplified.

Next, explanations will be made on the second example of the present invention referring to FIGS. 8 to 10. Said second example employs a passive range finding type focus detecting device in place of a photo-electrical image sharpness detecting type focus detecting device used in said first example, and elements shown in FIGS. 8 and 9 with same numbers and symbols as those in FIGS. 1 to 4 are exactly same as those in the first example, therefore explanations here will be made only on such set up as different from the first example.

What is shown as 43 is a first imaging lens fixedly provided at an appropriate position at a front plane of a camera, and a first photo-sensor array 44 having many members of photo-sensors 44a to 44d is fixedly positioned at a rear of said lens 43 in conformity with the imaging plane of said lens 43 in such manner that a center thereof matches with the optical axis of said lens 43. What is shown as 46 is a second imaging lens retained at an appropriate position of a front plane of a camera being separated from said first lens 43 with the prism 23 by a retaining frame 47 in such manner as being shiftable to the directions of k, i in the drawing and a second photo-sensor array 45 having many pieces of photo-sensors 45a to 45d is fixedly positioned at a rear of said lens 46 in conformity with the imaging plane of the lens 46.

What is shown as 48 is a guide means for said retaining frame 47, and what is shown as 49 is a spring to bias sid retaining frame 47 to the direction of the arrow l. What is shown as 50 is a first crank lever being controlled by the cam 8b' at said adjusting member 8 to drive said lens 46 to the directions of the arrows k, l in correspondence to the shifting of the photo-taking optical system 1, wherein said lever 50 is axially attached to an appropriate place within a camera by an axle 51 in a freely rotatable member and is engaged with a pin 47a planted on upper partof said retaining frame 47 by a fork part 50a formed at a forward end of one of its arms and is also engaged with the cam 8b' of the adjusting member 8 by the cam follower 50b planted at a forward end part of the other arm.

And the cam 8b' at said adjusting member 8 has an oblique part $8b'_1$ to shift the lens 46 between a position at which an image of an object at the closest distance position is properly matched at a center of the array 45 and a position at which an image of an object at an infinite position can be properly matched with a center of said array 45 (that is a position at which the optical axis of the lens 46 and the center of the array 45 match together) in correspondence with the oblique groove part $8a_1$ at the cam groove 8a, and has a flat part $8b'_2$ to retain said lens 46 at a position at which an image of an object at the closest distance position can be properly matched with the center of the array 45 in correspondence to the parallel groove part $8a_2$ at the cam groove 8a.

And in this case, especially the oblique groove part $8a_1$ at the cam groove 8a and the oblique part $8b'_1$ at the cam 8b' are so formed as having a certain corresponding relationship so that the photo-taking optical system 1 will be just set at an in focus position against an object when the relative positional parallax between two images on the arrays 44 and 45 becomes zero in a course of setting the lens 46. What is shown as 52 is a second crack lever movable in correspondence with the shifting of the lens 46, and said lever 52 is axially attached to an appropriate place within a camera by an axle 53 in a freely rotatable manner, and at a same time it is engaged with a pin 47b planted on the lower part of the retaining frame 47 by a fork part 52a formed at a forward end of one of its arms.

What is shown as 54 is a lever to shift the movable member 24 corresponding to the rotation of the crank lever 52 that is corresponding to the shifting of the lens 46 and the photo-taking optical system 1, wherein said lever 54 is axially attached at an appropriate place within a camera by an axle 55 in a freely rotatable manner, and is engaged with an oval hole 52b formed near a forward end of the other arm of the crank lever 52 by a pin 54b planted near a forward end of one of the arms of said lever 54, and at a same time it is engaged with a hook space arm 24b of the movable member 24 by a fork part 54b formed at a forward end of the other arm of the same.

According to the above mentioned set up, while an image of an object formed by the first imaging lens 43, in a state a camera is pointed to an object, is properly matched at a center of the first photo-sensor array 44, an image of the object formed by the second imaging lens 46 will have a relative positional parallax corresponding to the deviation of the set position of the photo-taking optical system 1 from a position at which the photo-taking optical system 1 is properly focused on the object to be photographed and will be formed on the second photo-sensor array 45. And at this time, when the adjusting member 8 is shifted to an appropriate direction the first crank lever 50 is rotated by the cam 8b' of said adjusting member 8, therefore, the second lens is shifted to the direction of the arrow k or l corresponding to the shifting of said adjusting member 8, therefore the position of the image on the second photo-sensor array 45 is varied. Therefore, when the adjusting member 8 is shifted while detecting the relative positional parallax between the two images on the both arrays 44 and 45 by comparison of the outputs of the arrays 44 and 45 and the member 8 is stopped at a point where the outputs of said arrays 44 and 45 coincide each other that is at a point where the imaging positional relationship of each of the two images on said arrays 44 and 45 coincides each other, the photo-taking optical system 1 will be set at an in focus position for the object.

Figure 8:
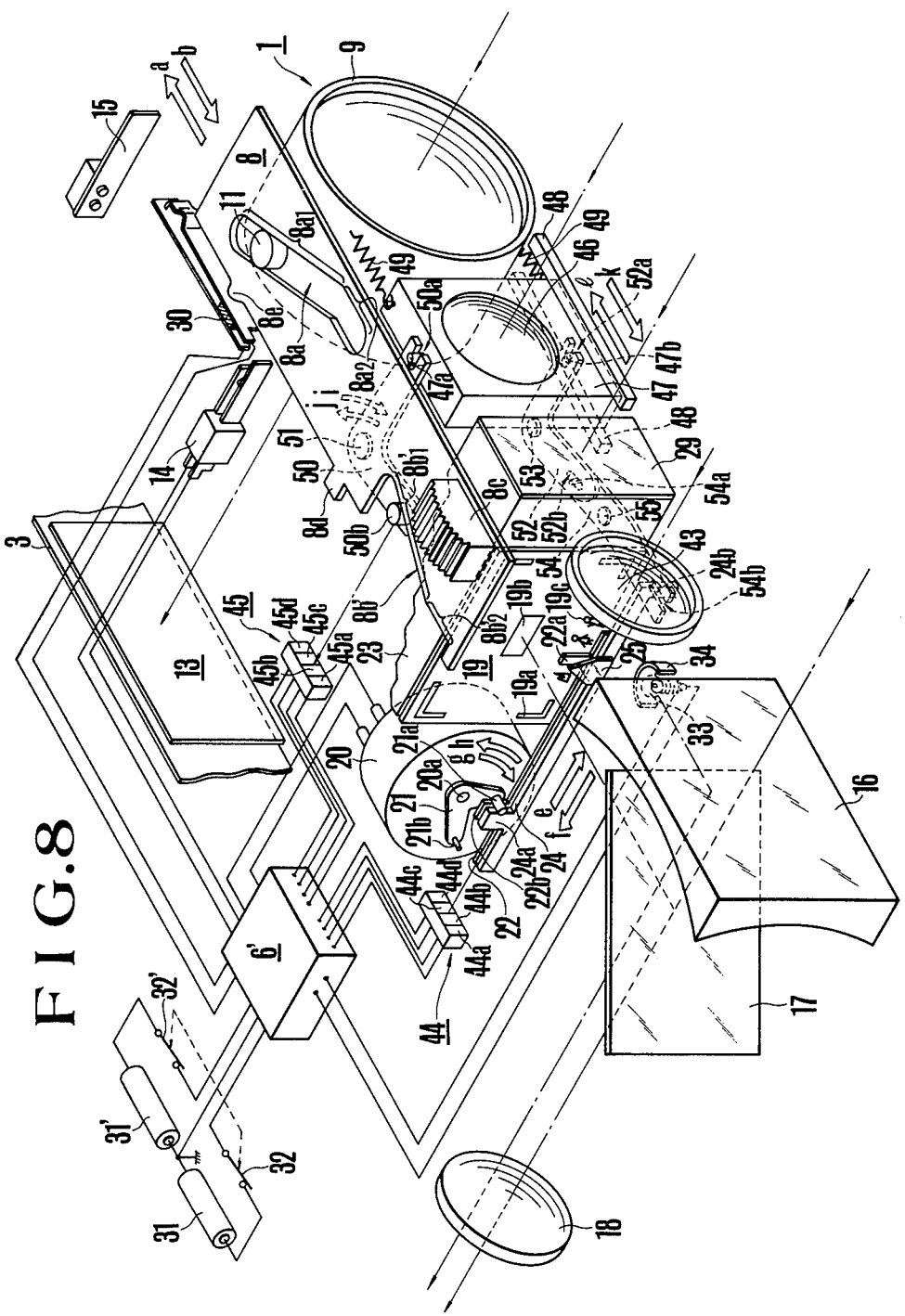
FIGS. 8 to 10 are to show a second example of a camera using a focusing system of the present invention.
Figure 9:
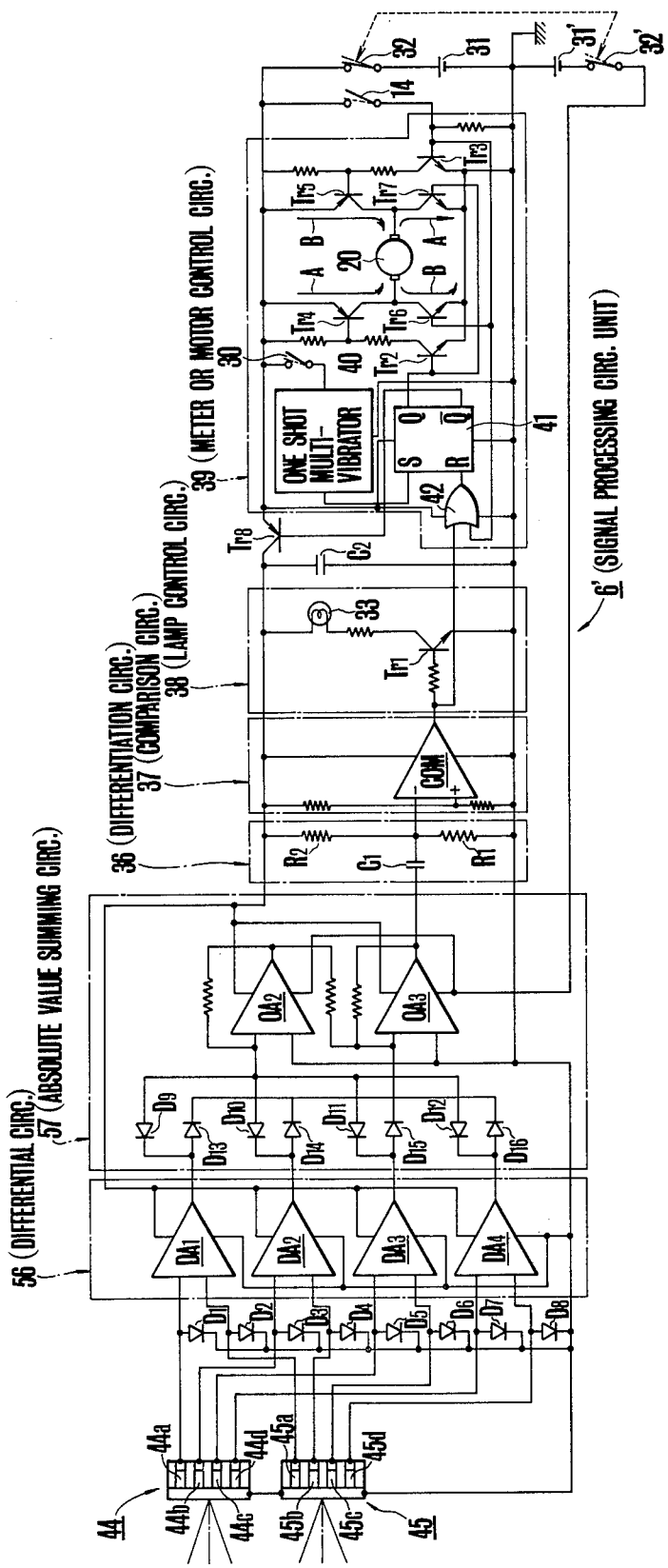
Figure 10:
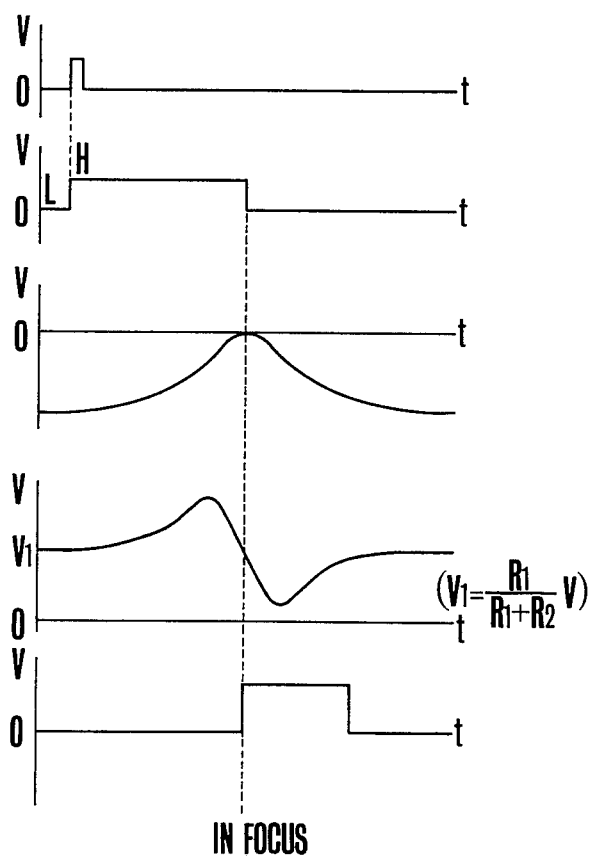

In the above mentioned operation, a signal processing circuit unit shown as 6' in FIG. 8 processes the outputs of said both photo-sensor arrays 44 and 45 to detect relative coincidence or non-coincidence of the imaging positions of the two images on said both arrays 44 and 45 for controlling the driving means 20 and the lamp 33 based on the result of said detection, and details of said unit 6' ar shown in FIG. 9.

That is, in FIG. 9, what are shown as $D_1$ to $D_8$ are diodes to logarithmically compress the outputs of the photo-sensors 44a to 44d, 45a to 45d. And what is shown as 56 is a differential circuit to obtain differences among the logarithmically compressed outputs of the pairs of the photo-sensors, 44a - 45a, 44b - 45b, 44c - 45c, 44d - 45d being in relative positional relationship mutually at each of the arrays 44, 45 (that is ratio of each output at each of the pairs of the photo-sensors), and said circuit 56 consists of such number of differential amplifiers $DA_1$ to $DA_4$ as corresponding to the number of pairs of the photo-sensors.

What is shown as 57 is an absolute value summing circuit to convert each of the outputs of the differential amplifiers $DA_1$ to $DA_4$ in said differential circuit 56 into absolute value and add the same together, and said circuit 57 consists of a combination of a first circuit part comprising diodes $D_9$ to $D_{12}$ which are inversely connected and function against negative input signals and a first operational amplifier $OA_2$, and a second circuit part comprising diodes $D_{13}$ to $D_{16}$ which are forwardly connected and function against positive input signals and a second operational amplifier OA₃. Also said first and second operational amplifiers OA₂ and OA₃ are set at an inverse amplification mode, therefore, the output of said absolute value summing circuit 57 presents such negative output as shown by (C) in FIG. 10 as ideally reaching zero when the imaging positions of images on ech of the arrays 44 and 45 relatively coincide, therefore the output of each sensor at each of the photo-sensor pairs, 44a – 45a, 44b – 45b, 44c – 45c, 44d – 45d coincide to each other and the output of each of the differential amplifiers DA₁ to DA₄ at the differential circuit 56 all becomes zero.

Also the differentiation circuit 36, the comparison circuit 37, the lamp control circuit 38 and the meter or motor control circuit 39 are exactly same as those in FIG. 4.

Also what is shown as 32' is a switch associated with the power source switch 32, and said switch 32' is provided in a negative power source circuit containing the power source 31', while the switch 32 is provided in a positive power source circuit containing the power source 31.

Next explanations will be made on a function of a camera using a focusing system having the above mentioned set up at a time of photo-taking.

First, the power source switches 32 and 32' are put in and a camera is pointed to an object to be photographed. At this time a finder is viewed, and if the indication member 22 and the movable member 24 are not reset at their respective initating positions, the adjusting member 8 is shifted by its operating part 8c to the direction of the arrow "a" until it is restricted by an end of the parallel groove part 8a₂ at the cam groove 8a to reset each operating member at an initiating position of each one thereof as in the above mentioned example. And as said resetting is done, the second imaging lens 46 is shifted to the direction of the arrow "k" to its extremity resisting the working power of the spring 49 as the first crank lever 50 is rotated to its maximum extent by the flat part 8b'₂ at the cam 8b' around the axle 50 to the direction of the arrow "i", and is set at such position that an image of an object at the closest distance position can be properly focused at a center of the second photo-sensor array 45 in correspondence to the setting psoition of the photo-taking optical system 1 at that time (that is the photo-taking optical system 1 is set at its closest distance position in resetting).

And when the operation of the adjusting member 8 is once suspended after completion of said resetting, said adjusting member is automatically returned to its closest distance setting position by the action of the sheet spring 15, and as the initiating switch 30 is put in by the projection 8e of the adjusting member 8, the flip-flop 41 is set (as shown in FIG. 10(b) ) in the signal processing circuit unit 6' by the output of the one-shot multi-vibrator 40 (shown in FIG. 10(a) ) in the meter or motor control circuit 39, therefore power supply to the driving circuit 20 is initiated through a channel shown by A in FIG. 9, and at a same time the transistor Tr₈ becomes turned-on, then power supply is initiated from the power sources 31, 31' to the differential circuit 56, the absolute value summing circuit 57, the differentiation circuit 36, the comparison circuit 37 and the lamp control circuit 38.

If an object is not placed at the closest distance position allowing a photo-taking by the camera under the above mentioned state, the position of the image of the object formed by the second imaging lens 46, at that time, on the second photo-sensor array 45 will be relatively deviated against the position of the image of the same object formed by the first imaging lens on the first photo-sensor array 44 (that is the image formed by the first lens 43 under s state the camera is pointed to the object is properly focused at the center of the first photo-sensor array 44) corresponding to the deviation of the adjusting member of the photo-taking optical system 1 at that time (that is the closest distance position) from the in focus position.

And as the adjusting member 8 is shifted to the direction of the arrow "b" under said state, the photo-taking optical system 1 is shifted to the direction of the film plane along its optical axis by the oblique groove part 8a₁ of the cam groove 8a, and at a same time the crank lever 50 is rotated to the direction of the arrow "j" following the oblique part of 8b₁ 0 at the cam 8b', therefore, the second lens 46 is shifted to the direction of the arrow "l" by the working power of th spring 49, thus the position of the image on the second photo-sensor array 45 will be varied depending on the setting degree of the photo-taking optical system 1, and at a same time the movable member 24 is shifted by the levers 52, 54 to the direction of the arrow "f" corresponding to the shifting of the lens 46 and the photo-taking optical system 1, and the restriction over the output lever 21 is released, then said output lever 21 drives the indication member 22 to the direction of the arrow "f".

And when the imaging position of the image on the second photo-sensor array 45 becomes relatively coinciding with the imaging position of the image on the first photo-sensor array 45 in a course of said setting, each of the outputs of the photo-sensor pairs, 44a – 45a, 44b – 45b, 44c – 45c, 44d – 45d, in a relative positional relationship with each other at each of the arrays 44, 45 becomes coinciding as mentioned before, therefore, the output of each of the differential amplifiers DA₁ to DA₄ at the differential circuit 56 all becomes zero, thus the output of the absolute value summing circuit 57 at that time reaches zero level as shown in FIG. 10(c). And by this, the putput of the differentiation circuit 36 becomes suddenly changing from above to below said predetemined voltage level V₁ as shown in FIG. 10(a), thus pulse shape signals will be outputted from the comparison circuit 37 as shown in FIG. 10(e), therefore, the lamp 33 is lighted to indicate that the imaging positions of two images on the both photo-sensor arrays 44 and 45 become coinciding relatively that is the photo-taking optical system 1 reaches an in focus point, and at a same time the flip-flop in the meter or motor control circuit 39 is reset as shown in FIG. 10(b), then power supply to the driving means 20 is stopped, and the indication member 22 is stopped at a position to indicate the object distance at that time.

Therefore the operation of the adjusting member 8 is immediately stopped as the lamp 33 is lighted, and the photo-taking optical system 1 at that time will be set at an in focus position against the object.

Also in this case, it is very difficult to instantly stop the opertion of the adjusting member 8 at a moment the indication lamp 30 is lighted, and a delay in stopping the adjusting member 8 is apt to take place, therefore such a state is apt to take place that the photo-taking optical system 1 passes over its in focus point and is set at a position a little deviated to longer distance position side. But, if the timing to stop the operation of the adjusting member 8 is delayed and the mark filter 25 of the movable member 24 is deviated from the indication member 22a of the indication member 22, the adjusting member 8 is then shifted to the direction of the arrow "a" that is to the infinite distance setting side until mark filter 25 of the movable member 24 matches with the indicating part 22a of the indication member 22, then the photo-taking optical system 1 will be properly reset at its in focus position.

While no particular mention was made in the explanations of the above examples, in a focus adjusting system of the present invention, such manner of setting that the adjusting member 8 is once shifted from its starting position that is from its closest distance setting position to the direction of the arrow "b" and to its final position that is to its infinite setting position under a state a camera is pointed to an object (wherein the shifting speed at this time should desirably be constant within such range that particularly the differentiation circuit 36 in the signal processing circuit 6, 6' can properly function), then the adjusting member 8 is then shifted to the direction of the arrow "a" until the mark filter 25 in the movable member 24 matches with the indicating part 22a of the indication member 22 which has already been stopped, is deemed to be comparatively effective in securing accuracy in focus adjusting and in simplifying its operation.

In summarizing what has been explained above, a focus adjusting system of the present invention has such set up that a mark means having a indicating part to indicate an in focus distance position of a photo-taking optical system against an object is driven by an electromagnetic driving means which is activated from a prescribed position to one direction corresponding to electrical signals from an automatic focus detecting device and is stopped when said detecting device detects an in focus state of said photo-taking optical system against the object corresponding to the change in the output of said detecting device, and on the other hand a indicating part to indicate a setting distance positions of said photo-taking optical system is provided, further a movable member being shiftable in correspondence to the setting of said photo-taking optical system is provided along with said indication member, then in photo-taking said driving means is stopped in response to the change in the output of said detecting device in a course of shifting of the photo-taking optical system from a prescribed position to one direction, thus the photo-taking optical system is so set that the indicating part at said movable means matches with the position indicated by the indicating part at said indication means when said indication means is stopped, thus achieving a focus of said photo-taking optical system against the object. And according to the present invention with such set up, the above mentioned disadvantages in a conventional camera which has a focus detection only automated but does not have a setting of a photo-taking optical system automated, that is such disadvantages that a user of this kind of conventional camera is required to possess a skill in setting of a photo-taking optical system to find out an in focus position of said optical system, and for example, he is compelled to make such very troublesome handling as moving the photo-taking optical system back and forth near an in focus point and judging whether the photo-taking optical system reaches an in focus point or not from the indication state of an indication means, thus feeling great inconvenience in achieving an exact focusing of said optical system, are completely eliminated, and the system can be made with a comparatively simple set up and a very low cost, yet its handling is simplified, further exact focusing can be always expected, thus the system has great effects being very useful in practical use for example, as applied to a pocket size camera or a middle class camera, etc.

What is claimed is:

1. A focusing system for focusing an image forming optical system on an object, said optical system having an optical axis and being adjustable along the axis, said focusing system comprising;
   (A) manually operable adjusting means for adjusting said optical system along the optical axis;
   (B) first indication means movable in response to the adjustment of the optical system so as to indicate the adjusted position of the optical system on the optical axis;
   (C) detecting means for detecting the in focus position of the optical system to the object, said detecting means providing an electrical signal representative of said in focus position of the optical system;
   (D) second indication means adapted for indicating said in focus position of the optical system detected by said detecting means; and
   (E) driving means for driving said second indication means, said driving means setting the second indication means to a position at which the second indication means indicates said in focus position of the optical system, in response to said electrical signal provided by said detecting means;
   whereby proper focusing of the optical system on the object can be made by so adjusting the optical system that the first indication means matches with the in focus position indicated by the second indication means.

2. A focusing system according to claim 1, further comprising:
   actuating means for providing a start signal adapted for starting said driving means; and
   control means for controlling said driving means, said control means being electrically coupled to said driving means, said actuating means and said detecting means and starting the driving means in response to said start signal provided by the actuating means and stopping the driving means in response to said electrical signal provided by the detecting means.

3. A focusing system according to claim 2, wherein said adjusting means is movable between a first and a second predetermined positions so as to adjust said optical system within a predetermined range along the optical axis; and
   said actuating means is operatively associated with said adjusting means and provides said start signal when the adjusting means is set to said first position; and further,
   said detecting means is arranged so as to provide said electrical signal representative of the in focus position of the optical system to the object in the process of the movement of the adjusting means from said first position to said second position.

4. A focusing system according to claim 3, wherein said first indication means is provided with a restricting member for restricting the shifting of said second indication means, said restricting member releasing the retriction of the shifting of the second indication means as said adjusting means is moved from said first position to said second position; and said driving means shifting the second indication means when the restricting member release the restriction of the shifting of the second indication means.

5. focusing system according to claim 1, further comprising;
scale means having a plurality of marks each representing different distance positions of the optical system;
said first indication means being movable along said scale means and indicating the adjusted distance position of the optical system on the scale means;
said second indication means being shiftable along said scale means and indicating the in focus distance position of the optical system on the scale means.

6. A focusing system for focusing an image forming optical system on an object, said optical system having an optical axis and being adjustable along the axis, said focusing system comprising:
(A) manually operable adjusting means for adjusting said optical system along the optical axis, said adjusting means being operatively coupled to the optical system;
(B) first indication means movable in response to the adjustment of the optical system so as to indicate the adjusted position of the optical system on the optical axis;
(C) detecting means for detecting the in focus position of the optical system to the object, said detecting means providing an electrical signal representative of said in focus position of the optical system;
(D) second indication means shiftable from a predetermined first position to a second position at which the second indication means indicates said in focus position of the optical system to the object; and
(E) driving means for shifting said second indication means from said first position to said second position, said driving means stopping the shifting of the second indication means so as to set the second indication means to the second position in response to said electrical signal provided by said detecting means;
whereby proper focusing of the optical system on the object can be made by so adjusting the optical system that the first indication means matches with the in focus position indicated by the second indication means.

7. A focusing system according to claim 6, further comprising:
actuating means for providing a start signal adapted for starting said driving means; and
control means for controlling said driving means, said control means being electrically coupled to said driving means, said actuating means and said detecting means and starting the driving means in response to said start signal provided by the actuating means and stopping the driving means in response to said electrical signal provided by the detecting means.

8. A focusing system according to claim 7, wherein said adjusting means is movable between a first and a second predetermined positions so as to adjust said optical system within a predetermined range along the optical axis; and
said actuating means is operatively associated with said adjusting means and provides said start signal when the adjusting means is set to said first position; and further said detecting means is arranged so as to provide said electrical signal representative of the in focus position of the optical system to the object in the process of the movement of the adjusting means from said first position to said second position.

9. A focusing system according to claim 8, wherein said first indication means is provided with a restricting member for restricting the shifting of said second indication means, said restricting member releasing the restriction of the shifting of the second indication means as said adjusting means is moved from said first position to said second position; and said driving means shifting the second indication means when the restricting member release the restriction of the shifting of the second indication means.

10. A focusing system according to claim 9, wherein said adjusting means is further settable to a third predetermined position beyond said first predetermined position; and said focusing system further comprises:
resetting means for providing a reset signal adapted for resetting said second indication means to said first position thereof, said resetting means being operatively associated with said adjusting means and providing said reset signal when the adjusting means is set to said third position thereof;
said control means being electrically coupled to said resetting means and actuating said driving means in a reverse direction in response to said reset signal, so that the driving means resets the second indication means to the first position thereof.

11. A focusing sysem according to claim 10, further comprising;
scale means having a plurality of marks each representing different distance positions of the optical system;
said first indication means being movable along said scale means and indicating the adjusted distance position of the optical system on the scale means;
said second indication means being shiftable along said scale means and indicating the in focus sitance position of the optical system on the scale means.

12. A focusing system in a photographic camera for focusing a photo-taking lens system on an object to be photographed, said lens system having an optical axis and adjustable along the axis, said focusing system comprising;
(A) manually operable adjusting means for adjusting said lens system along the optical axis, said adjusting means being operatively coupled to the lens system;
(B) first indicating means movable in response to the adjustment of the position system so as to indicate the adjusted position of the lens system on the optical axis;
(C) second indication means adapted for indicating the in focus position of the lens system to the object, said second indication means being shiftable from a predetermined first position to a second position at which the second indication means indicates said in focus position of the lens system to the object;
(D) driving means for driving said second indication means from said first position to said second position; and
(E) detecting means for detecting the focusing condition of the lens system to the object, said detecting means providing an electrical signal for stopping said second indication means when detects the in focus condition of the lens system to the object;

said driving means topping the shifting of said secodn indication means so as to set the second indication means to said second position in response to said electrical signal provided by said detecting means;

whereby, proper focusing of the lens system on the object to be photographed can be made by so adjusting the lens system that the first indication means matches with the in focus position indicated by the second indication means.

13. A focusing system according to claim 12, further comprising:

actuating means for providing a start signal adapted for starting said driving means; and control means for controlling said driving means, said control means being electrically coupled to said driving means, said actuating means and said detecting means and starting the driving means in response to said start signal provided by the actuating means and stopping the driving means in response to said electrical signal provided by the detecting means.

14. A focusing system according to claim 13, wherein said adjusting means is movable between a first and a second predetermined positions so as to adjust lens system within a predetermined range along the optical axis; and said actuating means is operatively associated with said adjusting means and provides said start signal when the adjusting means is set to said first position; and further, said detecting means is arranged so as to provide said electrical signal representative of the in focus position of the lens system to the object in the process of the movement of the adjusting means from said first position to said second position.

15. A focusing system according to claim 14, wherein said first indication means is provided with a restricting member for restricting the shifting of said second indication means, said restricting member releasing the restriction of the shifting of the second indication means as said adjusting means is moved from said first position to said second position; and said driving means shifting the second indication means when the restricting member release the restriction of the shifting of the second indication means.

16. A focusing system according to claim 15, further comprising;

scale means having a plurality of marks each representing different distance position of the lens system;

said first indication means being movable along said scale means and indicating the adjusted distance position of the lens system on the scale means;

said second indication means being shiftable along said scale means and indicating the in focus distance position of the lens system on the scale means.

17. A focusing system according to claim 16, wherein said camera is provided with view finder optical means adapted for viewing said object; and wherein said scale means and said first and second indication means are disposed at positions viewable from outside the camera through said view finder optical means.

* * * * *